United States Patent

Norton et al.

[11] Patent Number: 6,140,636
[45] Date of Patent: Oct. 31, 2000

[54] SINGLE TRACK ENCODER FOR PROVIDING ABSOLUTE POSITION INFORMATION

[75] Inventors: Kirkpatrick William Norton; Cathy Cavanaugh, both of San Diego, Calif.

[73] Assignee: Hewlett-Packard Company, Palo Alto, Calif.

[21] Appl. No.: 09/046,942

[22] Filed: Mar. 23, 1998

[51] Int. Cl.[7] .................................................. G01D 5/34
[52] U.S. Cl. ...................................... 250/231.18; 356/375
[58] Field of Search ...................... 250/231.18, 231.16, 250/231.14, 237 R, 237 G; 324/207.23, 207.24, 207.25; 356/373, 374, 375; 345/165, 166

[56] References Cited

U.S. PATENT DOCUMENTS

| | | | |
|---|---|---|---|
| 4,945,231 | 7/1990 | Ohya et al. | 250/231.16 |
| 5,068,529 | 11/1991 | Ohno et al. | 250/231.18 |

*Primary Examiner*—Que T. Le

[57] ABSTRACT

An optical encoder provides absolute position information by inducing a position error in its output signal. The position error can be induced in the signal by shifting a slot in an encoder wheel or encoder strip relative to other slots in the encoder wheel. The position error is detected to identify an absolute position of the encoder wheel or the encoder strip.

27 Claims, 5 Drawing Sheets

SINGLE TRACK ENCODER FOR PROVIDING ABSOLUTE POSITION INFORMATION

BACKGROUND OF THE INVENTION

The invention relates to position sensors. More specifically, the invention relates to an optical encoder for providing absolute position information.

Optical encoders are commonly used in printers to provide feedback information regarding rate and direction of rotation of a roller. When pressed against a sheet of paper, the roller feeds the sheet through the printer. The feedback information is used by a closed loop controller to maintain the roller at a constant rate of rotation and the sheet at a constant linear feed rate.

A typical optical encoder includes an encoder wheel having multiple encoder lines. Each line includes a spoke and a slot. The spoke and slot might be a reflective region and a non-reflective region, or an opaque region and a transparent region, etc. During operation of the optical encoder, a portion of the encoder wheel is illuminated. Encoder lines passing through the illuminated portion cast a shadow pattern onto a detector array. The shadow pattern includes a series of bands (e.g., dark regions and light regions). When the encoder wheel is rotated, the bands are moved across the detector array at a rate that is proportional to the rate of angular rotation of the encoder wheel. An encoder having a single channel (i.e., a one-channel encoder) could detect roller rotation rate for the controller. An encoder having a second channel (i.e., a two-channel encoder) could also detect direction of rotation for the controller.

In certain printers, however, it is desirable to know absolute position of the roller in addition to rate and direction of rotation. Such printers typically utilize three-channel encoders that provide the absolute position information. A three-channel encoder might include an additional reference slot in the encoder wheel and additional detectors in the array to detect the reference slot. Two of the three channels provide rotation rate and direction information, and the third channel is asserted whenever the encoder wheel is at zero degrees, thus providing absolution position information about the encoder wheel.

Adding the third channel increases the cost of the optical encoder. Part of the cost increase is due to the cost of the extra detectors used for the third channel. However, adding the third channel also adds mechanical contacts to the optical encoder and increases the size of the encoder wheel. The cost of extra material for the third channel can add a few dollars to the cost of the optical encoder.

Mass market products such as printers are extremely cost-sensitive. Any increase in the cost of the optical encoder will be absorbed primarily by the printer manufacturer. Increasing the cost of a single optical encoder by a few dollars might seem trivial, but it can have a substantial impact on the profits of a printer manufacturer, especially a printer manufacturer selling millions of printers per year.

There is a need for a low cost encoder that allows absolute position to be determined.

SUMMARY OF THE INVENTION

The invention can be regarded as a low-cost encoder that can provide feedback information regarding absolute position without an additional channel. The encoder includes a phase-shift detector and a movable member including a plurality of encoder lines. The plurality of encoder lines cause a mask pattern to be projected onto the detector during operation of the encoder. The mask pattern is moved across the detector while the member is being moved relative to the detector. The plurality of encoder lines include a first line and a group of second lines. The first line causes a phase shift to be induced in the mask pattern. The phase shift corresponds to an absolute position of the member.

Other aspects and advantages of the present invention will become apparent from the following detailed description, taken in conjunction with the accompanying drawings, illustrating by way of example the principles of the present invention.

DETAILED DESCRIPTION OF THE INVENTION

Figure 1:
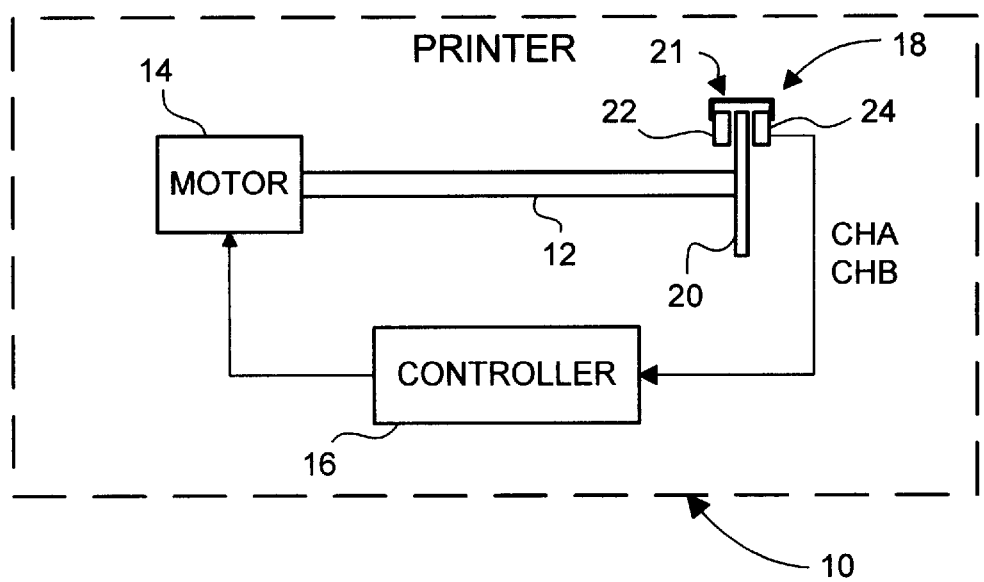
FIG. 1 is a block diagram of a printer including an encoder according to the present invention.

As shown in the drawings for purposes of illustration, the present invention is embodied in an encoder associated with a printer. The encoder generates a signal that provides absolute position information, but it provides the absolute position information without an additional channel. Thus, a two-channel encoder according to the present invention can provide information regarding direction of motion, speed and absolute position, but at a lower cost than a three-channel encoder.

FIG. 1 shows a printer 10 including a shaft 12, a motor 14 and a controller 16 for the motor 14. During operation of the printer 10, the motor 14 rotates the shaft 12 under control of the controller 16. The shaft 12, in turn, drives a roller (not shown), which feeds sheets of paper through the printer 10. The roller can be driven clockwise and counterclockwise. The controller 16 uses feedback information to maintain the roller rotation at a desired angular rate. The feedback information includes rate of roller rotation and direction of roller rotation.

The feedback information also includes absolute position of the roller. Feed rate of the sheets through the printer 10 might be dependent upon the angular position of the roller. For instance, the roller might not be perfectly round and, at different angular positions, might feed the sheets through the printer 10 at different rates, even at a relatively constant rate of rotation. The controller 16 uses the absolute position information to compensate for the variations in feed rate. For example, the controller 16 might change the rate of rotation depending upon the angular position of the roller.

A two-channel encoder 18 provides the feedback information regarding direction and angular rate of rotation of the shaft 12 and, therefore, the roller. The two-channel encoder 18 also provides the feedback information regarding absolute position of the shaft 12.

The encoder 18 includes an encoder wheel 20 and an incremental position encoder module 21. The encoder module 21 includes an illuminator 22 such as an LED for emitting a beam of light. Mounted concentrically to the shaft 12, the encoder wheel 20 includes multiple encoder lines that modulate the light beam while the encoder wheel 20 is being rotated by the shaft 12. The encoder module 21 further includes a detector array 24 for detecting the modulated light beam. An output of the detector array 24 generates a signal providing two channels CHA, CHB of information about relative position of the encoder wheel 20. At least one of the encoder lines induces a position error in the detector output signal. Because the position of the error-inducing line(s) on the encoder wheel 20 is known, the absolute position of the encoder wheel 20 and, therefore, the absolute position of the shaft 12 and roller can be detected when the position error is detected.

The controller 16 processes the detector output signal to derive direction of rotation and angular rate of rotation of the shaft 12. The controller 16 also detects the position error in the detector output signal. Once the position error has been detected, the controller 16 initializes a counter count to a reference value indicating the known position. Thereafter the count is updated for changes in relative position of the shaft 12. Thus, the count indicates absolute position of the shaft 12. The controller 16 can use the absolute position information to compensate for position-dependent errors in the roller.

Figure 2:
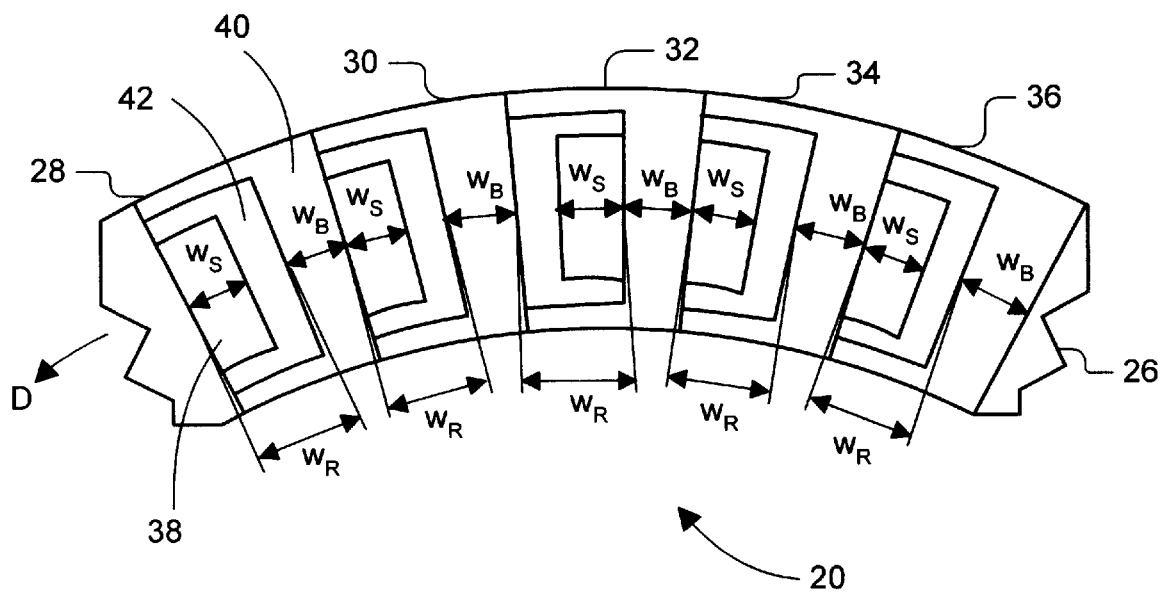
FIG. 2 is an illustration of a section of an encoder wheel according to the present invention.

FIG. 2 shows the encoder wheel 20 in greater detail. The encoder wheel 20 includes a rotatable planar disc 26 and a plurality of encoder lines on the disc 26. Although only five of the encoder lines 28, 30, 32, 34, 36 are shown in FIG. 2, the encoder wheel 20 might have ten encoder lines, or it might have more than 5000 encoder lines. The five encoder lines 28, 30, 32, 34, 36 are shown to explain the invention.

When the encoder lines 28, 30, 32, 34, 36 modulate the beam of light, they cause a moving shadow pattern to be cast on the detector array 24. One of those encoder lines 32 provides a reference and will hereinafter be referred to as a reference line 32. The other encoder lines 28, 30, 34 and 36 will be referred to as normal lines 28, 30, 34 and 36. When the reference line 34 modulates the light beam, it causes a phase shift to be induced in the shadow pattern. The location of the reference line 32 being known on the disc 26, the phase shift occurs at a known position of the encoder wheel 20.

Each encoder line 28, 30, 32, 34, 36 includes a slot 38 and a spoke 40. Each slot 38 is located within an allowable slot region 42. The width of each slot 38 is denoted by Ws, the bridging width of the spoke 40 is denoted by Wb, and the width of the allowable slot region 42 is denoted by Wr. All of the slots 38 are located at the same radius from the center of the disc 26.

The following three conditions affect the size and spacing of the slots 38: the specification of the encoder 18; ability of the detector array 24 to detect the phase shift; and the amount of positional error (induced by the reference line 32) that can be tolerated by the printer 10. For the two-channel encoder 18, there is a maximum ratio Rmax of the slot width Ws to the bridge width Wb, and there is a minimum ratio Rmin of the slot width Ws to the bridge width Wb. These ratios are dependent upon the specification of the encoder 18. To satisfy the encoder specification, the slots 38 are confined within the allowable slot region 42 as determined by the maximum ration Rmax, yet the slots are wide enough to satisfy the minimum ratio Rmin.

The slots 38 are sized such that all of the slots in the normal lines 28, 30, 34 and 36 can be biased towards the leading edges of their respective slot regions 42, and the slot in the reference line 32 can be biased towards the trailing edge of its slot region 42. Biasing the slot in the reference line 32 differently than the slots in the normal lines 28, 30, 34 and 36 causes the phase shift to be induced in the shadow pattern.

When the encoder wheel 20 is rotated in the direction of the arrow D and the light beam is modulated by the first and second normal lines 28, 30, a series of dark and light bands move across the detector array 24. The light bands produced by the first and second normal lines 28 and 30 are spaced apart evenly. When the slot in the reference line 32 enters the encoder module 21 and modulates the light beam, a light band is cast on the detector array 24, except that the light band produced by the reference line 32 is spaced differently than the light bands produced by the first and second normal lines 28 and 30. This phase shift occurs because the distance between the slot 38 in the reference line 32 and the slot 38 in the second normal line 30 is greater than the distance between the slots in first and second normal lines 28 and 30.

The phase shift in the shadow pattern is maximized when the slots 38 are made as narrow as possible, all slots in the normal lines 28, 30, 34 and 36 are biased to the same edges of their allowable slot regions 42, and the slot 38 in the reference line 32 is biased to the opposite edge of its allowable slot region 42. If the slot widths Ws are too large, there might not be sufficient space within the allowable slot region 42 to shift the slot 38 in the reference line 34. If this is the case, the generated phase shift might be too small and might be obscured by ambient motor jitter.

Shifting the slots 38 allows the phase shift to be induced in the shadow pattern without violating the specification of the encoder 18. Additionally, the phase shift in the shadow pattern is large enough to be detected by the detector array 24, and the resulting positional error caused by the reference line 32 is small enough to be tolerated by the printer 10.

Figure 3:
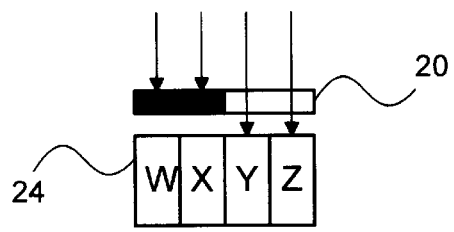
FIG. 3 is an illustration of the encoder wheel and an interdigitated single-line detector array.

FIG. 3 shows the encoder wheel 20 and a detector array 24 that includes four detector elements W, X, Y and Z for detecting a single encoder line at a time. The encoder wheel 24 modulates the light beam, indicated by the arrows, to causes a regular pattern of light and dark bands to be cast on the detector elements W, X, Y and Z. The waveforms on the first and second channels CHA, CHB are derived from the outputs of the four detector elements W, X, Y, Z as follows:

$$CH\ A = W + X - Y - Z$$

$$CH\ B = X + Y - W - Z$$

For the position shown in FIG. 3, the W and X detectors are fully masked and the Y and Z detectors are fully unmasked, whereby the first channel CHA=2 and the second channel CHB=0. For a second position of the encoder wheel 20, where X and Y are fully masked and W and Z are fully unmasked, the first channel CHA=0 and the second channel CHB=2. For a third position of the encoder wheel 20, where Y and Z are fully masked and W and X are fully unmasked, the first channel CHA=0 and the second channel CHB=0. For a fourth position of the encoder wheel 20, where W and Z are fully masked and X and Y are fully unmasked, the first channel CHA=0 and the second channel CHB=−2. Such interdigitation of the detector elements W, X, Y, Z can increase the signal-to-noise ratio. An interdigitated detector array is shown in Leonard U.S. Pat. No. 4,691,101, which is assigned to the assignee of the present invention.

Figure 4:
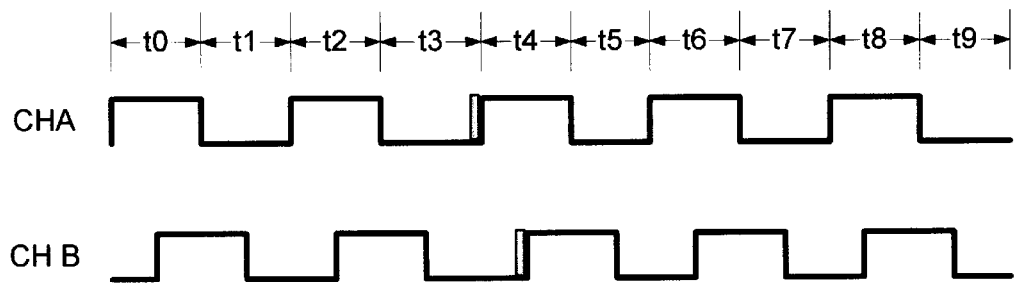
FIG. 4 is a diagram of waveforms generated by the encoder.

FIG. 4 shows waveforms 48 and 50 that might result when the light beam is modulated by the five encoder lines 28, 30, 32, 34 and 36. The detector array 24 is sampled at a rate that is higher than its clock frequency and provides a triangular waveforms on its output. To obtain the square shape of the waveforms 48 and 50, the signals on the output of the detector array 24 are cleaned up by means such as a comparator (not shown).

Each pulse in a waveform corresponds to an encoder line 28, 30, 32, 34 or 36. The waveforms 48 and 50 on the first and second channels CHA and CHB are the same, except that they are shifted by 90 degrees. The direction of rotation can be ascertained by determining whether the waveform 50 on the second channel CHB leads or lags the waveform 48 on the first channel CHA.

If the encoder wheel 20 is spun at a relatively constant rate, edges in the waveforms 48 and 50 will occur slightly earlier or slightly later depending on whether the encoder line entering the encoder module 21 is a normal line 28, 30, 34 or 36 or a reference line 32. When examining the waveform 48 on the first channel CHA, nominal time periods t0, t1, t2, t5, t6, t7, t8 and t9 occur between edges of the pulses corresponding to the normal lines 28, 30, 34 and 36. In contrast, the time period t3 is longer than the nominal time period, and the time period t4 is shorter than the nominal time period. These different time periods t3 and t4 correspond to the pulse corresponding to the reference line 32. Since the slot in the reference line 32 is shifted away from the slot 38 in the second normal line 30, the leading edge of the pulse corresponding to the reference line 32 takes longer to appear. This difference in time is indicated by the cross-hatched area. Since the slot of the reference line 32 is shifted closer to the slot of the next (third) normal line 34, the time period t4 between the trailing edge of the reference line pulse and the leading edge of the next pulse is shorter. These variations in time are used to identify the position error and the absolute position of the encoder wheel 20.

Figure 5:
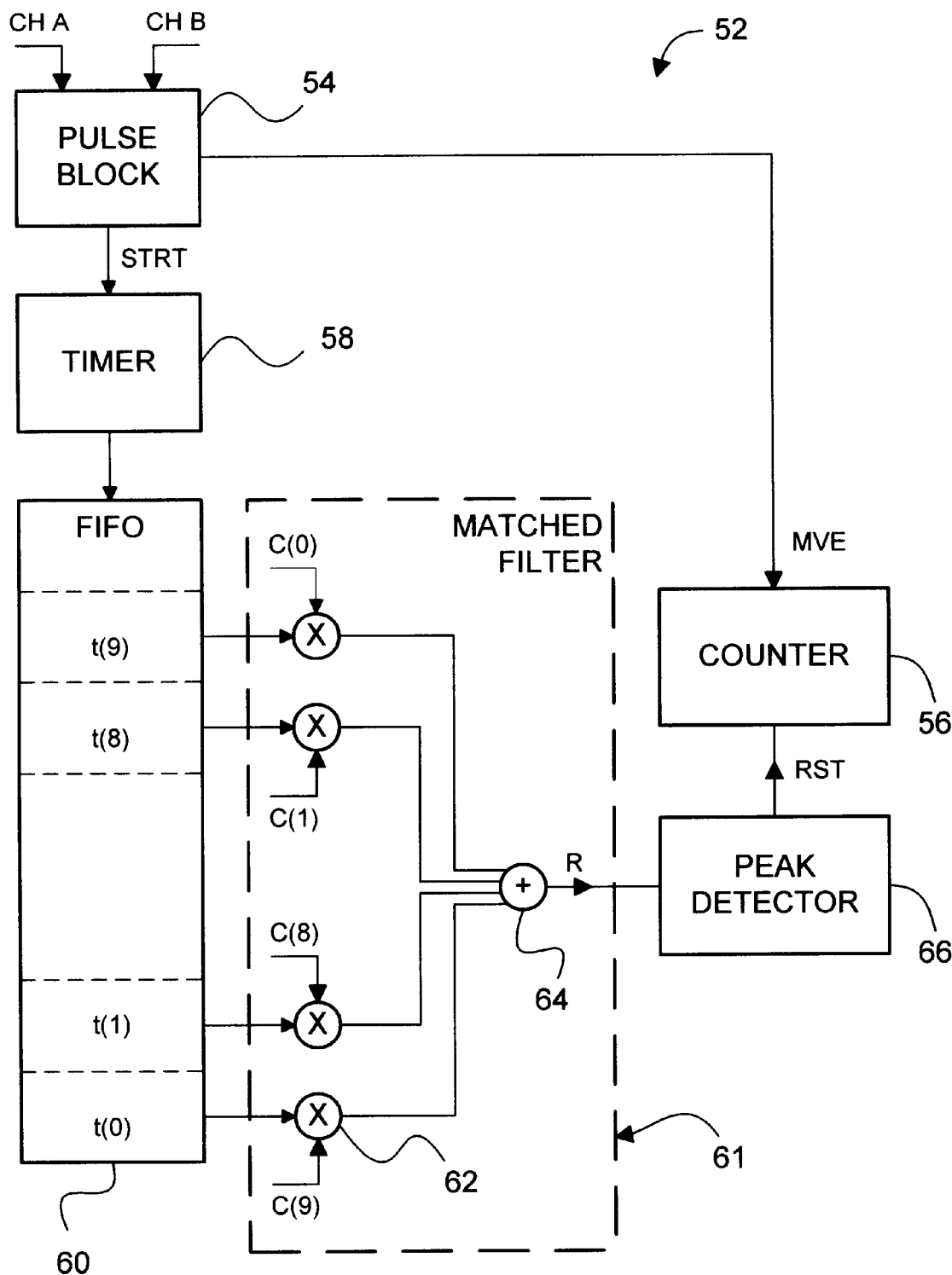
FIG. 5 is a diagram of a circuit for processing the waveforms generated by the detector array during operation of the encoder.

FIG. 5 shows a circuit 52 for processing the waveforms 48 and 50 to determine absolute position of the encoder wheel 20. A first block 54 generates a first pulse MVE whenever an edge is detected on either the first channel A or the second channel B. The first pulse MVE is supplied to a position counter 56. The first pulse MVE represents a change in relative encoder position by 90 degrees electrical. Thus, the value stored in the position counter 56 is incremented or decremented every 90 degrees of electrical rotation, depending upon the direction of rotation.

The first block 54 outputs a second pulse STRT whenever an edge is detected on the waveform on the first channel A. The second pulse STRT is supplied to a timer 58, which begins a count until another second pulse STRT is received. Thus, the timer 58 generates a sequence of counts t(0) to t(9) representing the time periods between edges of the waveform on the first channel CHA. After a count is taken, it is stored in a FIFO buffer 60.

A matched filter 61 is than applied to the counts t(0) to t(9) stored in the FIFO buffer 60 by, for example, applying a known correlation function to the counts t(0) to t(9). The correlation function is determined by characteristics of the encoder 18. The matched filter 61 could include at least one multiplier 62 and summer 64 for multiplying the counts t(0) to t(9) and correlation coefficients C(0) to C(9) as follows:

$$R = \Sigma C(n) t(n)$$

for n=0 to n=9. An output of the summer 64 provides a result R of the correlation.

A peak detector 66 is then applied to an output of the summer 64. When an expected value (e.g., a peak value) is detected (i.e., the phase shift has been detected), the peak detector 66 sends a reset pulse RST to the position counter 56. The reset pulse RST causes the position counter 56 to reset its count to a reference value. Therefore, detection of the error signal causes the position counter 56 to reset to the reference value. The reference value corresponds to a known position of the encoder wheel 26.

Each additional first pulse MVE from the first block 54 causes the position counter 56 to increment or decrement, depending upon the direction or rotation of the shaft 12. Thus, after the position counter 56 has been reset, an updated count represents a new absolute position of the encoder wheel 26.

Figure 6:
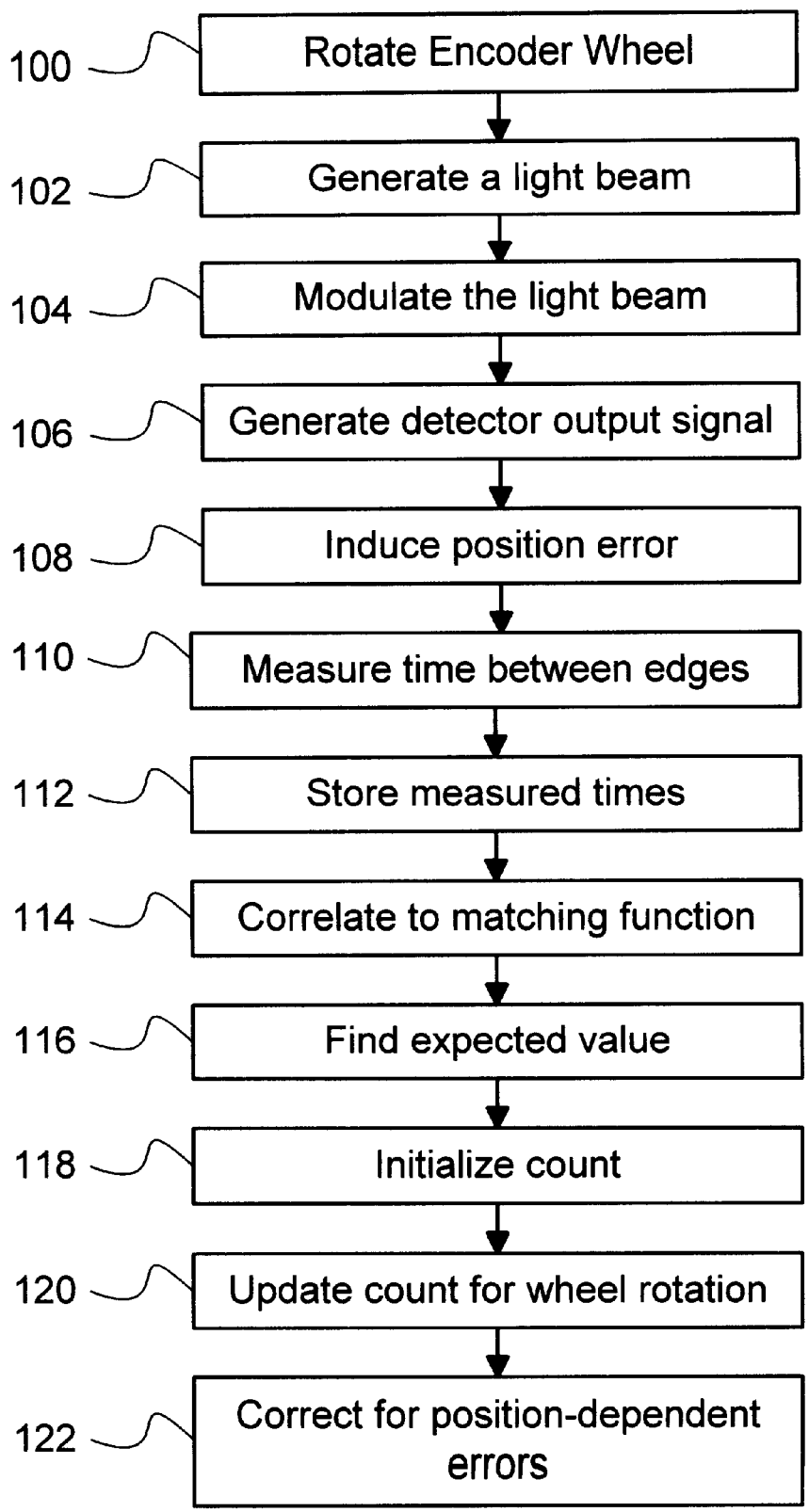
FIG. 6 is a flowchart of a method of operating the encoder, the method including steps for processing the waveforms.

FIG. 6 shows a method of operating the encoder 18, including generalized steps for processing the waveforms 48 and 50. First, the encoder wheel 20 is rotated (block 100). Absolute position measurement could begin after the encoder wheel 20 has reached a relatively constant angular rate, or it could begin while the encoder wheel 20 is being accelerated. To measure absolute position, the illuminator 22 is turned on, whereby a beam of light is directed towards the encoder wheel 20 (block 102). The encoder lines modulate the light beam and cause a moving shadow pattern to be cast on the detector array 24 (block 104). The detector array 24 generates an output signal in response to the detected shadow pattern (block 106). A position error is induced in the output signal when the light beam is modulated by the reference line 32 (block 108).

The waveforms on the output of the detector array 24 are then processed. Time between edges on one of the waveforms is measured (block 110), and values indicating the measured times are stored (block 112). The stored values are correlated to a predetermined matching function (block 114). The correlation can be performed after each new count is entered into the FIFO buffer 60. The result of the correlation is analyzed to identify an expected value such as a peak value (block 116).

When the expected value is found, a position count is initialized to a reference value (block 118). The count is then incremented or decremented to track the relative position changes in the position of the encoder wheel 20 (block 120). The count, which indicates the absolute position of the encoder wheel 20, can then be used to correct for position-dependent errors in the system (block 122). The position error induced by the reference line 32 can be minimized in post-processing since the error will be fairly predictable.

The count of the position counter 56 might be reinitialized each time the reference line 32 induces a phase shift in the shadow pattern. In the alternative, the count might be initialized only once. The reference position does not need to be detected after it is initially detected since the position counter 56 can track relative position changes of the encoder wheel 20. For example, the position counter might cycle at 1999 for an encoder wheel 20 having 500 lines (2000 quadrature counts). When the reference line 32 is detected, the position counter is set to zero. The position counter 56 is incremented or decremented as subsequent encoder lines enter the encoder module 21. The position counter 56 will return to zero whenever the encoder wheel 20 returns to the reference position, regardless of whether the position counter 56 is reset.

Figure 7:
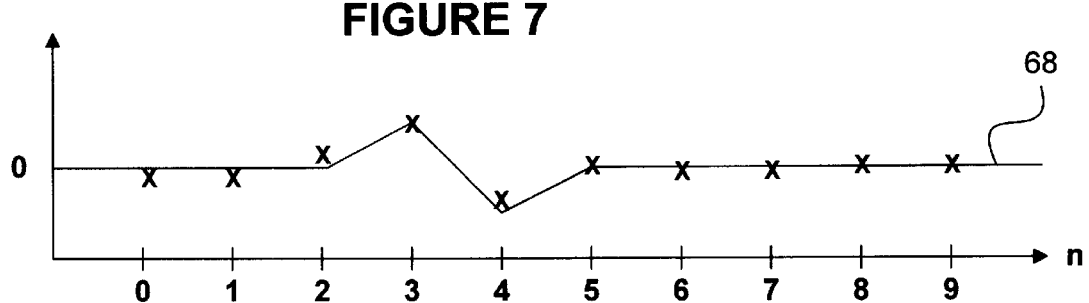
FIG. 7 is a plot of a correlation function that is correlated with measured time values during the processing of the waveforms.

FIG. 7 shows a correlation function 68 for the five encoder lines 28 to 34 and a detector array 24 that looks at a single encoder line at a time. The correlation function 68 is the expected response of the encoder 18. The correlation function 68 can be centered about zero by subtracting the nominal time period from the time periods between edges or by subtracting the current value from the previous value. The centered time values are denoted by "x." The correlation function 68 has a peak at n=4, which corresponds to the longer time required to detect the leading edge of the pulse corresponding to the reference line 32. The correlation function 68 has a valley at time n=5, which corresponds to the shorter time between the trailing edge of the pulse corresponding to the reference line 32 and the leading edge of the pulse corresponding to the third normal line 34. The correlation function 68 has values of 0 at the other times. The correlation coefficients C(n) are developed from the correlation function 68 and used by the processing circuit 52.

FIG. 7 also shows that some of the measured time values deviate from their expected values due to noise. Noise might be attributed to the motor (e.g., motor jitter), the processing circuit 52 (e.g., noise from thermal effects) and the encoder wheel 20 (e.g., imperfections in the encoder wheel 20). If the readings were made under ideal conditions, all of the centered time values at n=0 to n=9 would lie on the correlation function 68.

Thus disclosed is a low-cost encoder that allows absolute position to be detected. A two-channel encoder according to the present invention can provide information regarding direction, speed of movement and absolute position. A one-channel encoder according to the present invention can provide information regarding speed of movement and absolute position. Such a one-channel encoder might be used in a system including a shaft that is rotated in one direction only. An encoder according to the present invention does not need an extra channel for determining absolute position. Consequently, the encoder according to the present invention does not carry the extra costs associated with the extra channel.

The processing circuit could be implemented inexpensively within a digital ASIC. In the alternative, the timer and FIFO buffer could be implemented in hardware, and the matched filter, peak detector and position counter could be implemented inexpensively by a digital signal processor. The same digital signal processor could be used to control the motor.

These low cost optical encoders could make a substantial impact on the profits of a printer manufacturer selling millions of printers per year. Additionally, the low cost optical encoders could make a substantial impact on the profitability of a low cost systems that have razor thin profit margins.

The invention is not limited to use in printers. Rather, the invention can be used by any device that uses absolute position information. For example, the invention could be used in any device that compensates for position-dependent errors. However, the absolute position information can be used in ways other than compensating for position-dependent errors.

Figure 8:
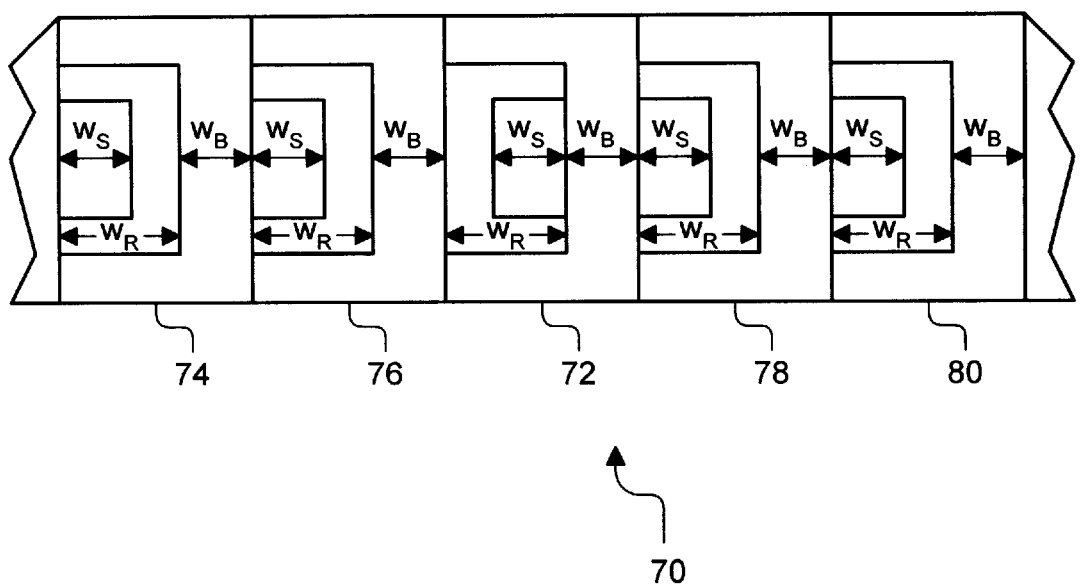
FIG. 8 is an illustration of an encoder strip according to the present invention.

Moreover, the invention is not limited to the specific embodiment described above. A linear encoder according to the present invention could include an encoder strip 70 that provides information regarding linear speed and absolute position (see FIG. 8). A phase shift is created in the shadow pattern by shifting the slot in the reference line 72 relative to the slots in the normal lines 74, 76, 78 and 80. Absolute position can be detected by a detector array and a processing circuit such as the detector array 24 and the processing circuit 52 described above.

Figure 9:
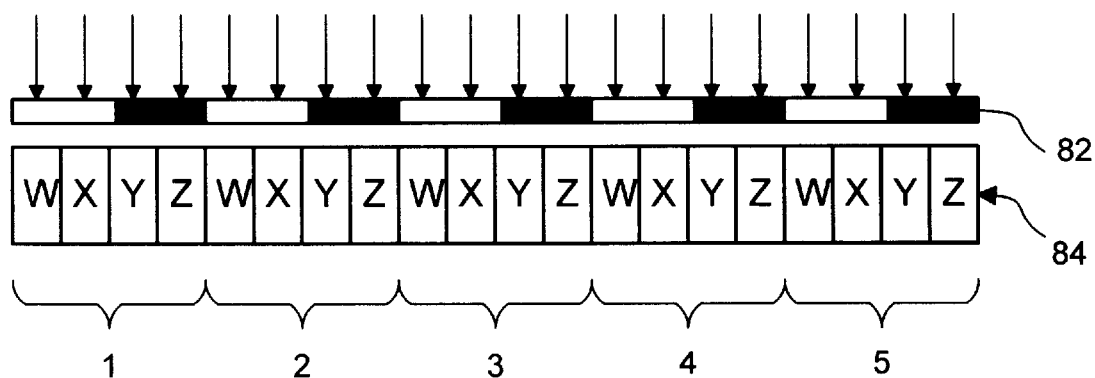
FIG. 9 is an illustration of an interdigitated, multiple-line detector array.

A detector array that detects more than one line at a time can be used. For example, FIG. 9 shows an encoder wheel 82 and an interdigitated, multiple line detector array 84. Shown are multiple groups of detector elements W, X, Y and Z. Each group includes four detector elements W, X, Y and Z. Thus, a detector array 84 having five groups of detector elements W, X, Y, Z can detect five encoder lines at a single time. Each group outputs channel A and channel B information. The channel A information from all of the groups is averaged together, and the channel B information from all of the groups is averaged together. Consequently, the output of the detector array 84 provides a signal including a first channel CHA that is an average of the channel A information and a second channel CHB that is an average of the channel B information from the groups.

The encoder wheel 82 can include five consecutive reference lines. A gradual change in phase shift will occur in the waveforms as more reference lines enter the encoder module. The maximum phase shift will occur when every encoder line being read by the detector array 84 is a reference line. As the encoder wheel 82 continues to rotate, the normal lines will begin to displace the reference lines, thereby causing a gradual reverse phase shift back to the original phase angle. A multiple-line detector array is also shown in Leonard U.S. Pat. No. 4,691,101.

The peak of the correlation function (not shown) for multiple line detection tends to rise more gradually than the peak of the correlation function for single line detection. Moreover, with multiple line detection, random errors due to noise are averaged out. Thus, multiple line detection offers a higher signal to noise ratio than single line detection.

There are other ways in which the invention is not limited to the specific embodiment described above. Any one of a number of techniques can be used to detect the reference line. The correlation technique described above is but one example. Moreover, peak detection could be performed without performing a correlation. Peak detection without correlation might be used for an encoder having a high signal-to-noise ratio.

A crude detection method of detecting the position error might include visual observation. One of the waveforms on the first or second channel A or B could be displayed on an oscilloscope. A slight shift in the waveform indicates the reference position of the encoder wheel or strip. The direction of the shift indicates the direction of movement.

An encoder according to the present invention could be a magnetic encoder. The spokes could be magnetic regions, the slots could be a non-magnetic regions and the detector would be a magnetic detector. An illuminator would not be needed.

Design considerations will depend upon the requirements of the system for which the encoder is intended. Such design considerations include the number of encoder lines, the actual widths of the slots, spokes and slot regions, the offset of the slot(s) in the reference line(s), the rotation rate of the encoder wheel, the number of detector elements per group, the number of groups of detector elements, the number of channels per encoder, whether to use an encoder strip or an encoder wheel, the algorithm for detecting the position error, etc.

Therefore, the invention is not limited to the specific embodiments described above. Instead, the invention is construed according to the claims that follow.

What is claimed is:

1. An encoder comprising:

a movable member including a single track of spaced-apart encoder lines, the encoder lines including a first line and a plurality of second lines, adjacent second lines being spaced apart at regular intervals, the first line being spaced apart from at least one second line at an irregular interval, the first line being located at a known position on the member;

a detector for detecting the encoder lines when the member is moved relative to the detector, an output of the detector indicating when the lines are detected; and a processor, responsive to an output of the detector, for identifying the irregular intervals caused by adjacent detected first and second lines, the irregular intervals occurring at the known position of the member;

whereby the processor determines absolute position of the member by identifying at least one irregular interval.

2. The encoder of claim 1, wherein the processor also identifies the regular intervals and uses the regular and irregular intervals to determine speed and relative position of the member.

3. The encoder of claim 1, wherein the detector output provides a plurality of pulses, each pulse corresponding to a detected encoder line, and wherein the processor determines the absolute position of the member by measuring times between edges of the pulses, and analyzing the measured times to identify the irregular intervals.

4. The encoder of claim 3, wherein the processor identifies the irregular intervals by correlating a sequence of the measured times to a predetermined sequence of times.

5. The encoder of claim 3, further comprising a resettable counter; and means for detecting edges in the pulses, the counter being updated when an edge is detected, the counter being reset when the irregular interval is detected, the counter being reset at least once.

6. The encoder of claim 1, wherein each encoder line has a slot that is positioned within a maximum allowable slot region, and wherein the slot of the first line is positioned differently than the slots of the second lines.

7. The encoder of claim 1, wherein each encoder line has a maximum allowable slot region and a slot located within the maximum allowable slot region, wherein the slots of the second lines occupy the same position within their respective maximum allowable slot regions, and wherein the slot of the first line occupies a different position within its maximum allowable slot region.

8. The encoder of claim 1, wherein the detector includes interdigitated detector elements.

9. The encoder of claim 1, wherein the member has multiple first lines; and wherein the detector includes a plurality of interdigitated detector elements for detecting the multiple first lines.

10. The encoder of claim 1, wherein the encoder is used in a printer to provide absolute feedback information, and wherein the processor uses the absolute position information to control the printer.

11. The encoder of claim 1, further comprising an illuminator operable to generate a light beam, wherein the encoder lines modulate the light beam when the member is moved relative to the detector, and wherein the detector is operable to detect the modulated light beam, whereby the encoder is an optical encoder.

12. An optical encoder comprising:

means for emitting a light beam;

a movable member including a plurality of encoder lines for modulating the light beam, the encoder lines including a first line and a plurality of second lines, adjacent second lines being spaced apart at regular intervals, the first line being spaced apart from at least one second line at an irregular interval, the first line being located at a known position on the member; and detecting means for detecting the modulated light beam, an output signal of the detecting means providing information about relative position of the member;

the first line modulating the light beam to induce an expected change in the output signal, the expected change corresponding to the known position on the member whereby the position of the member relative to the detecting means is known when the expected change occurs.

13. The encoder of claim 12, further comprising processing means for identifying the expected change in the output signal provided by the detecting means.

14. The encoder of claim 12, wherein each encoder line has a slot that is biased within a maximum allowable slot region, and wherein the slot of the first line is biased differently than the slots of the second lines.

15. The encoder of claim 12, wherein the member has multiple first lines: and wherein the detecting means includes a plurality of interdigitated detector elements for detecting the multiple first lines.

16. The encoder of claim 12, wherein the output signal includes a plurality of pulses corresponding to the encoder lines, and wherein the encoder further comprises processing means, responsive to the output signal, for measuring time differences between consecutive edges of the pulses, and correlating the measured time differences to a correlation function, the processing means identifying the expected chance in the output signal when the time differences are about correlated with the correlation function, whereby the position of the member relative to the detecting means is known when the expected change is identified.

17. The encoder of claim 16, wherein the processing means includes a resettable counter; and means for detecting edges in the pulses; the counter being updated when an edge is detected, the counter being reset when the expected change is identified.

18. An encoder processor for receiving a waveform and indicating a position of an encoder member relative to an encoder detector, the waveform including a plurality of pulses, the processor comprising:

means for measuring time periods between edges of the pulses;

means for identifying the time periods that are irregular; and means for indicating the position of the encoder member when an irregular time period is identified.

19. The processor of claim 18, further comprising means for correlating a sequence of the measured time periods to a predetermined sequence of time periods, wherein an irregular time period is identified from the correlation.

20. The processor of claim 18, further comprising a resettable counting means; and means for detecting the edges in the pulses; the counting means being updated when an edge is detected, the counting means being reset when the irregular time period is identified.

21. An article of manufacture for an encoder, the article comprising:

a movable planar member; and a track of encoder lines on the movable member;

the encoder lines including a first line and a group of second lines, each line including a slot that is biased within a corresponding maximum allowable slot range on the track, the slot of the first line being biased differently than the slots of the second lines.

22. The article of claim 21, wherein the slots of the second lines occupy the same position within their respective maximum allowable slot regions, and wherein the slot of the first line occupies a different position within its maximum allowable slot region.

23. The article of claim 21, wherein the member is an encoder wheel, and wherein the slots are equi-radially spaced from the center of the wheel.

24. A method of processing a signal from an encoder detector, the detector signal including a plurality of pulses, the method comprising the steps of:

measuring time periods between edges of the pulses;

identifying the time periods that are irregular; and indicating an absolute position when an irregular time period is identified.

25. The method of claim 24, further comprising the steps of resetting a count when an irregular time period is identified, and updating the count when a time period is measured.

26. The method of claim 24, wherein an irregular time period is identified by correlating a sequence of the measured time periods to a predetermined sequence of time periods; and identifying the irregular time period from the correlation.

27. The method of claim 24, wherein an irregular time period is identified by measuring times between the edges of the pulses; and identifying the irregular time period from the measured times.

* * * * *